United States Patent
Samardzic et al.

(10) Patent No.: US 9,298,065 B1
(45) Date of Patent: Mar. 29, 2016

(54) HIDDEN CAMERA SYSTEM WITH ENCLOSURE INCORPORATING A FLEXIBLE SEAL

(71) Applicant: FORD GLOBAL TECHNOLOGIES, LLC, Dearborn, MI (US)

(72) Inventors: Igor Samardzic, Tecumseh (CA); David Lee Jarvis, Madison Heights, MI (US); Jeffrey Mayville, Ypsilanti, MI (US)

(73) Assignee: Ford Global Technologies, PLLC, Dearborn, MI (US)

(*) Notice: Subject to any disclaimer, the term of this patent is extended or adjusted under 35 U.S.C. 154(b) by 0 days.

(21) Appl. No.: 14/556,328

(22) Filed: Dec. 1, 2014

(51) Int. Cl.
| | |
|---|---|
| *G03B 17/00* | (2006.01) |
| *G03B 17/04* | (2006.01) |
| *G03B 17/56* | (2006.01) |
| *G03B 29/00* | (2006.01) |

(52) U.S. Cl.
CPC .............. *G03B 17/04* (2013.01); *G03B 17/561* (2013.01); *G03B 29/00* (2013.01)

(58) Field of Classification Search
USPC .......................................... 396/427; 348/151
See application file for complete search history.

(56) References Cited

U.S. PATENT DOCUMENTS

| | | | | |
|---|---|---|---|---|
| 7,527,440 B1* | 5/2009 | White | ..................... | G03B 17/00 315/82 |
| 2003/0067693 A1* | 4/2003 | Imoto | ....................... | B60R 1/00 359/831 |
| 2006/0072008 A1* | 4/2006 | Miyazaki | ................ | B60R 11/04 348/118 |
| 2013/0155238 A1* | 6/2013 | Scudder | .................. | B60R 11/04 348/148 |

FOREIGN PATENT DOCUMENTS

| | | |
|---|---|---|
| CN | 103640524 A1 | 3/2014 |
| DE | 102009008281 A1 | 8/2010 |
| DE | 102012023009 A1 | 5/2013 |
| DE | 102013111224 A1 | 4/2014 |
| KR | 20120066294 A * | 6/2012 |

OTHER PUBLICATIONS

English machine translation of CN103640524.
English machine translation of DE102009008281.
English machine translation of DE102012023009.
English machine translation of DE102013111224.
English machine translation of KR20120066294.

* cited by examiner

*Primary Examiner* — Clayton E Laballe
*Assistant Examiner* — Warren K Fenwick
(74) *Attorney, Agent, or Firm* — Jason Rogers; King & Schickli, PLLC

(57) ABSTRACT

A hidden camera system for a vehicle includes a housing having first and second openings. A displaceable cover closes the first opening. A camera is received in the housing. That camera is deployable with respect to the first opening. A flexible seal closes the second opening.

11 Claims, 12 Drawing Sheets

82

HIDDEN CAMERA SYSTEM WITH ENCLOSURE INCORPORATING A FLEXIBLE SEAL

TECHNICAL FIELD

This document relates generally to camera systems for vehicles and, more particularly, to a hidden camera system that incorporates a flexible seal at the rear of the enclosure/housing.

BACKGROUND

It is known in the art to provide a camera system for a vehicle wherein the camera is normally concealed behind a cover, such as a vehicle badge or emblem. When activated, the cover is opened and the camera is deployed to provide a desired field of view useful in allowing an operator to better operate a vehicle. Such a camera system designed to insure repeatability of the positioning of the camera in the fully deployed position is disclosed in copending U.S. patent application Ser. No. 14/467,841, filed on Aug. 25, 2014 and entitled "Hidden Camera System for Vehicle", the full disclosure of which is incorporated herein by reference.

This document relates to a new and improved camera system including a housing or enclosure with a flexible rear seal. That flexible seal not only protects the motor, linkage and camera from dirt, debris and contaminants when in the stored position within the housing but also will not convey load from the forward portion of the enclosure should the assembly contact fixed members to the rear in response to an impact event. Thus, some degree of enhanced pedestrian protection is provided.

SUMMARY

In accordance with the purposes and benefits described herein, a hidden camera system is provided for a vehicle. That hidden camera system comprises a housing including a first opening and a second opening. A displaceable cover is carried on the housing for opening and closing the first opening. A camera is received in the housing. That camera is deployable with respect to the first opening. Further a flexible seal closes the second opening.

In one possible embodiment the second opening is opposite the first opening. In one possible embodiment the first opening is provided at a front side of the housing and the second opening is provided at a rear side of the housing.

In one possible embodiment the flexible seal is a pleated diaphragm. The flexible seal includes a cavity facing toward the interior of the housing.

A drive motor and an associated transmission are received in the housing. A linkage connects the drive motor and transmission to the camera and the cover. In one possible embodiment, the linkage includes a crank arm, a first link, a second link, a cover support bracket and a camera mounting bracket. The drive motor is connected to the crank arm through the transmission. Further a biasing element is provided to bias the camera to a fully deployed position. The camera projects at least partially through the first opening when in the fully deployed position In the following description, there are shown and described several preferred embodiments of the camera system. As it should be realized, the camera system is capable of other, different embodiments and its several details are capable of modification in various, obvious aspects all without departing from the camera system as set forth and described in the following claims. Accordingly, the drawings and descriptions should be regarded as illustrative in nature and not as restrictive.

BRIEF DESCRIPTION OF THE DRAWINGS

The accompanying drawings incorporated herein and forming a part of the specification, illustrate several aspects of the camera system and together with the description serve to explain certain principles thereof. In the drawings.

Reference will now be made in detail to the present preferred embodiment of the camera system, examples of which are illustrated in the accompanying drawing figures.

DETAILED DESCRIPTION

Figure 1:
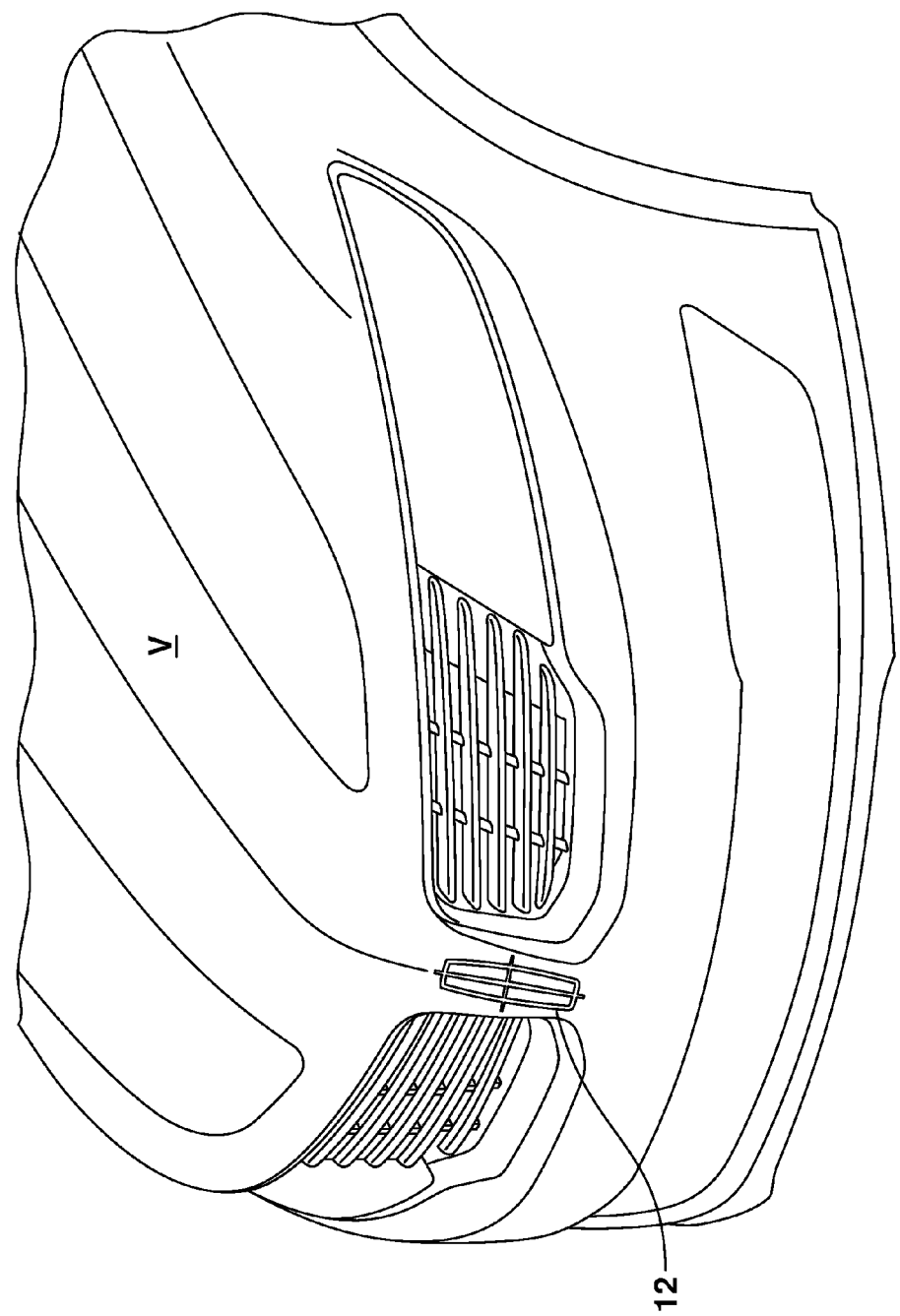
FIG. 1 is a front elevational view of a vehicle equipped with the current camera system which is shown in a retracted or closed position so that the camera is hidden from view by the manufacturer emblem or cover provided on the vehicle.
Figure 2:
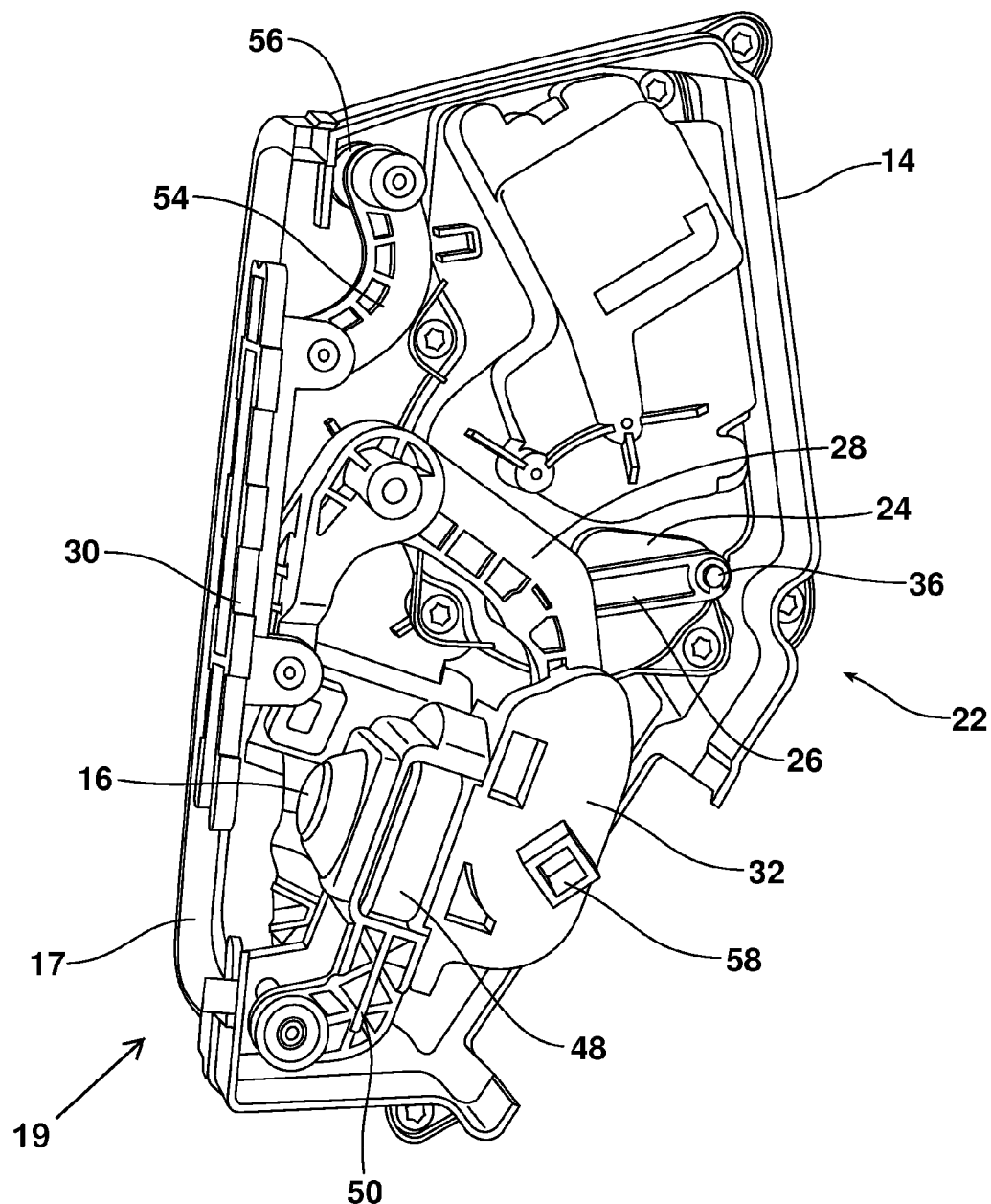
FIG. 2 is a first detailed, left side fragmentary view of the camera system in a retracted position.
Figure 3:
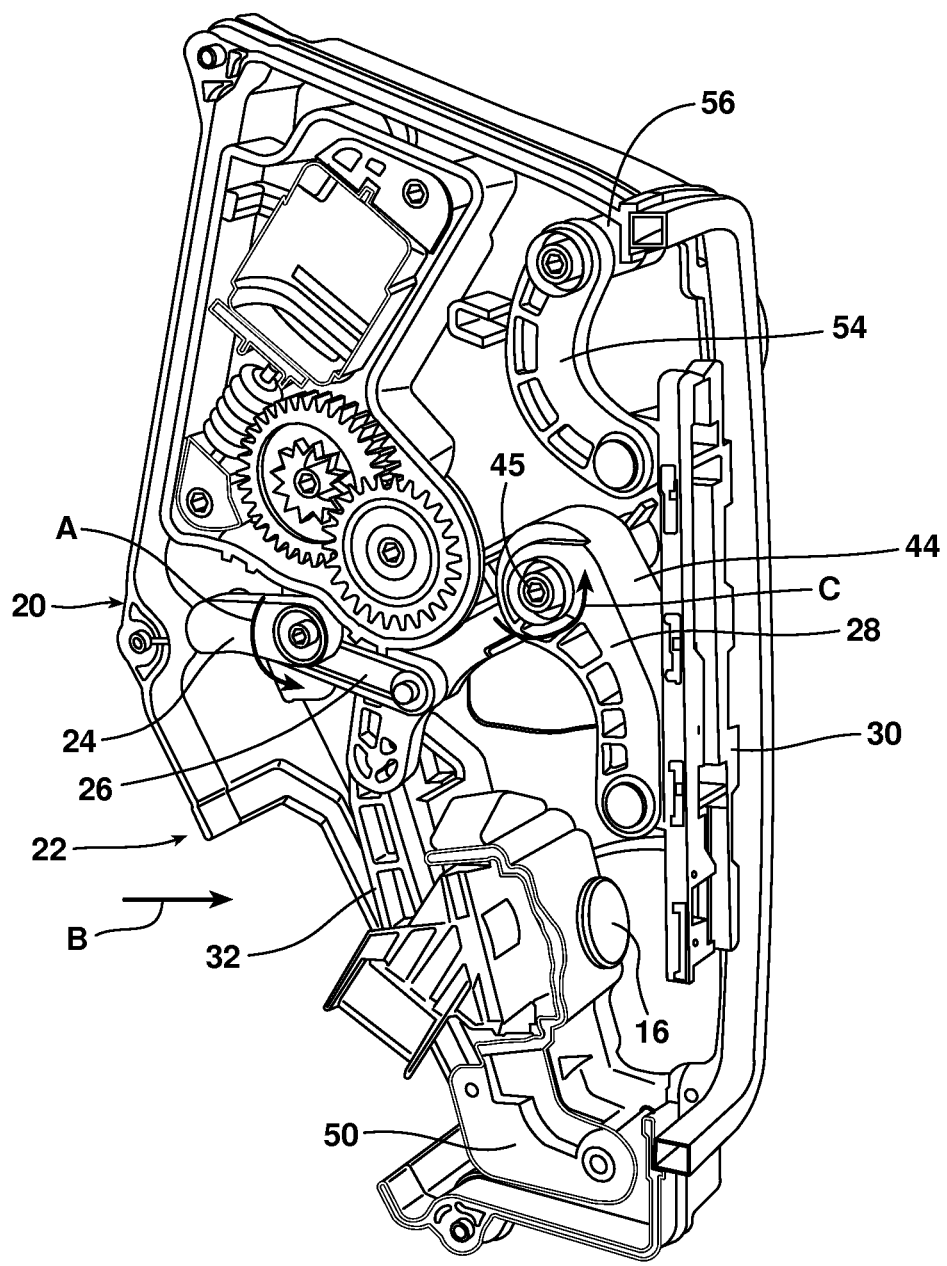
FIG. 3 is a second detailed, right side fragmentary view of the camera system in a retracted position.

Reference is now made to FIG. 1 illustrating a vehicle V equipped with a hidden camera system 10 which is concealed behind the cover 12 which, in the illustrated embodiment, is formed by the manufacturer emblem. As illustrated in FIGS. 2 and 3, the hidden camera system 10 includes a housing or enclosure 14 that holds a camera 16, a drive motor 18 and associated gear transmission 20, and a linkage 22 connecting the drive motor and gear transmission to the cover 12 and the camera 16. A gasket 17 is provided around the first or front opening 19 of the housing 14 and seals the front of the housing when the cover 12 is closed.

As illustrated, the linkage 22 includes a crank arm 24, a first link 26, a second link 28, a cover support bracket 30 on which the cover 12 is mounted, and a camera mounting bracket 32. More specifically, the crank arm 24 is connected to the gear transmission 20 by a rotating driveshaft 34. The opposite end of the crank arm 24 is pivotally connected to the first link 26 by the pivot pin 36. The second end of the first link 26 is connected to the second link 28 by the pivot pin 38. The first end of the second link 28 is connected to the cover support bracket 30 by a pivot pin 40. The second end of the second link 28 is connected to the camera mounting bracket 32 by a cam or roller 42 that is received and moves in a track 43 provided on the camera mounting bracket.

Figure 7:
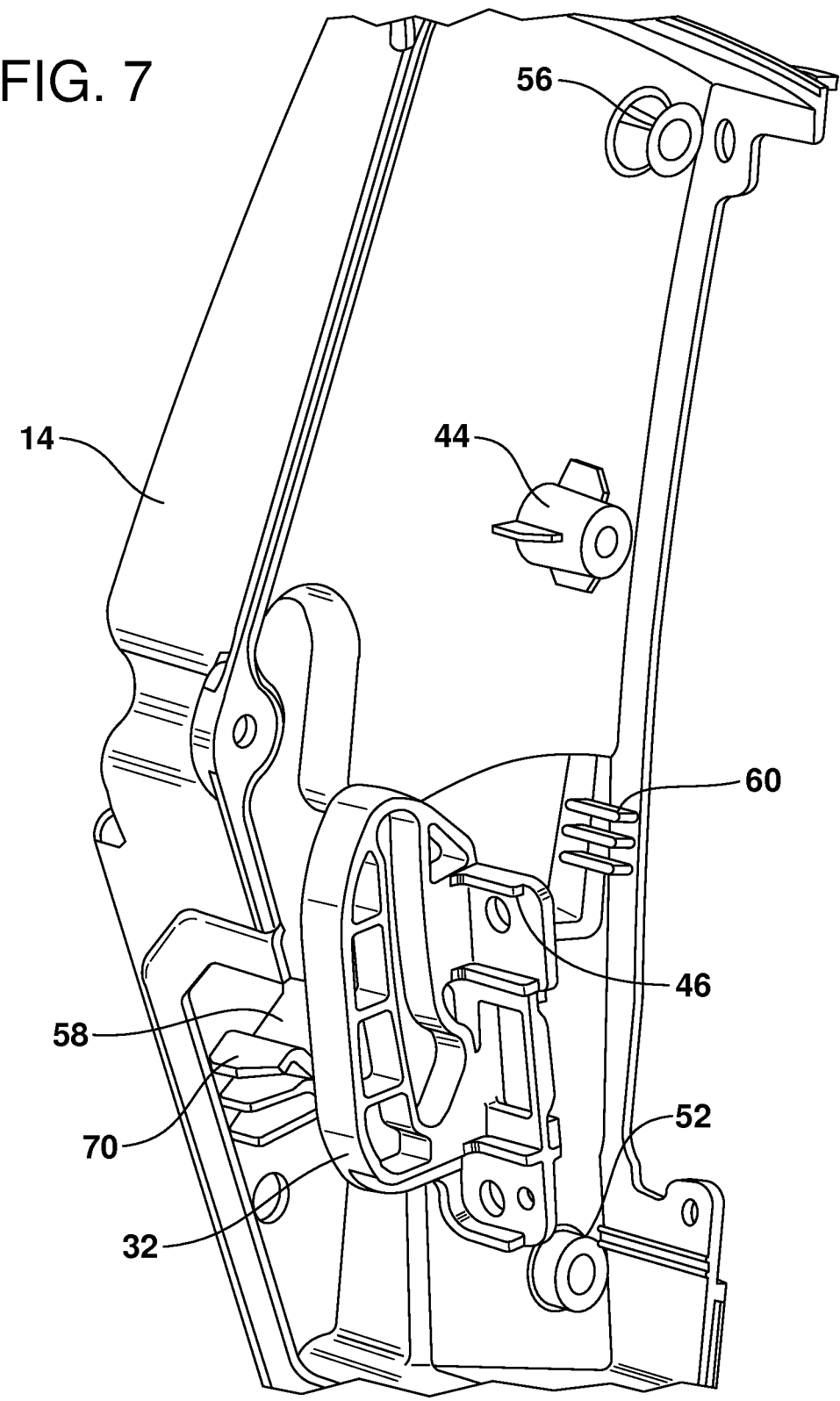
FIG. 7 is a detailed perspective view of the camera link with the abutment on the camera link engaging the second stop when the camera is in the fully retracted position and the cover is closed over the camera.

As should be further appreciated, the second link 28 is pivotally mounted at a first point to the housing 14 by a pivot pin 45 received in a boss 44 (see also FIG. 7). The pivot pin 38 connecting the first and second links 26, 28 is provided at a second point on the link 28 between the first point and the second end. In the illustrated embodiment, the second link 28 is substantially c-shaped.

The camera mounting bracket 32 includes flanges 46 and other related structures to engage the housing 48 of the camera 16 and securely hold the camera in position. The camera mounting bracket 32 is pivotally connected to the housing 14 by means of a first pivoting support arm 50. More specifically, the support arm 50 is pivotally supported on the housing 14 by means of the boss 52. The cover support bracket 30 (and, therefore, the cover 12 supported thereon) is pivotally mounted to the housing 14 by means of a second pivoting support arm 54. More specifically, the second support arm 54 is pivotally mounted to the housing 14 on the boss 56.

Figure 4:
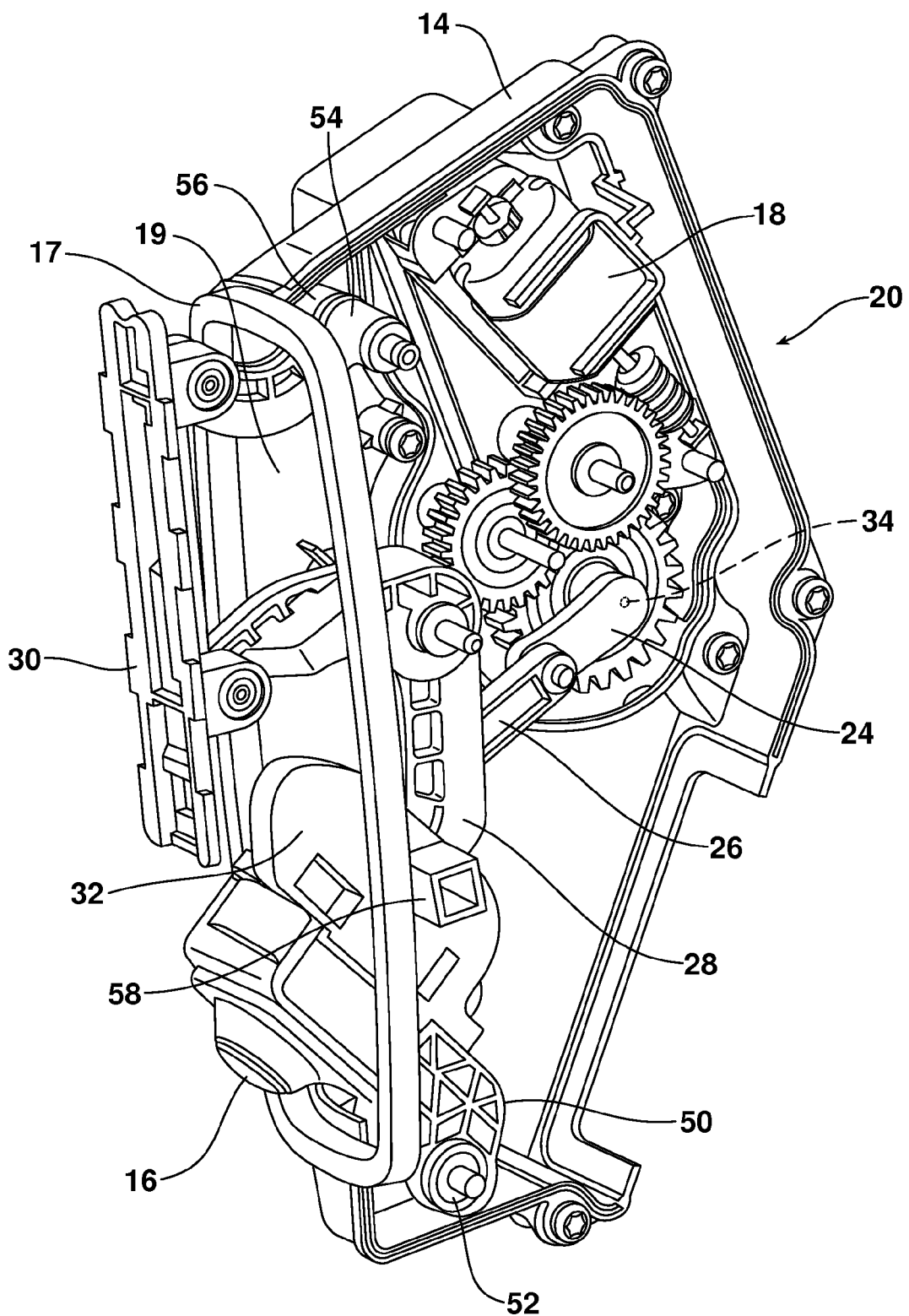
FIG. 4 is a first detailed, left side fragmentary view of the camera system in the fully deployed position.
Figure 5:
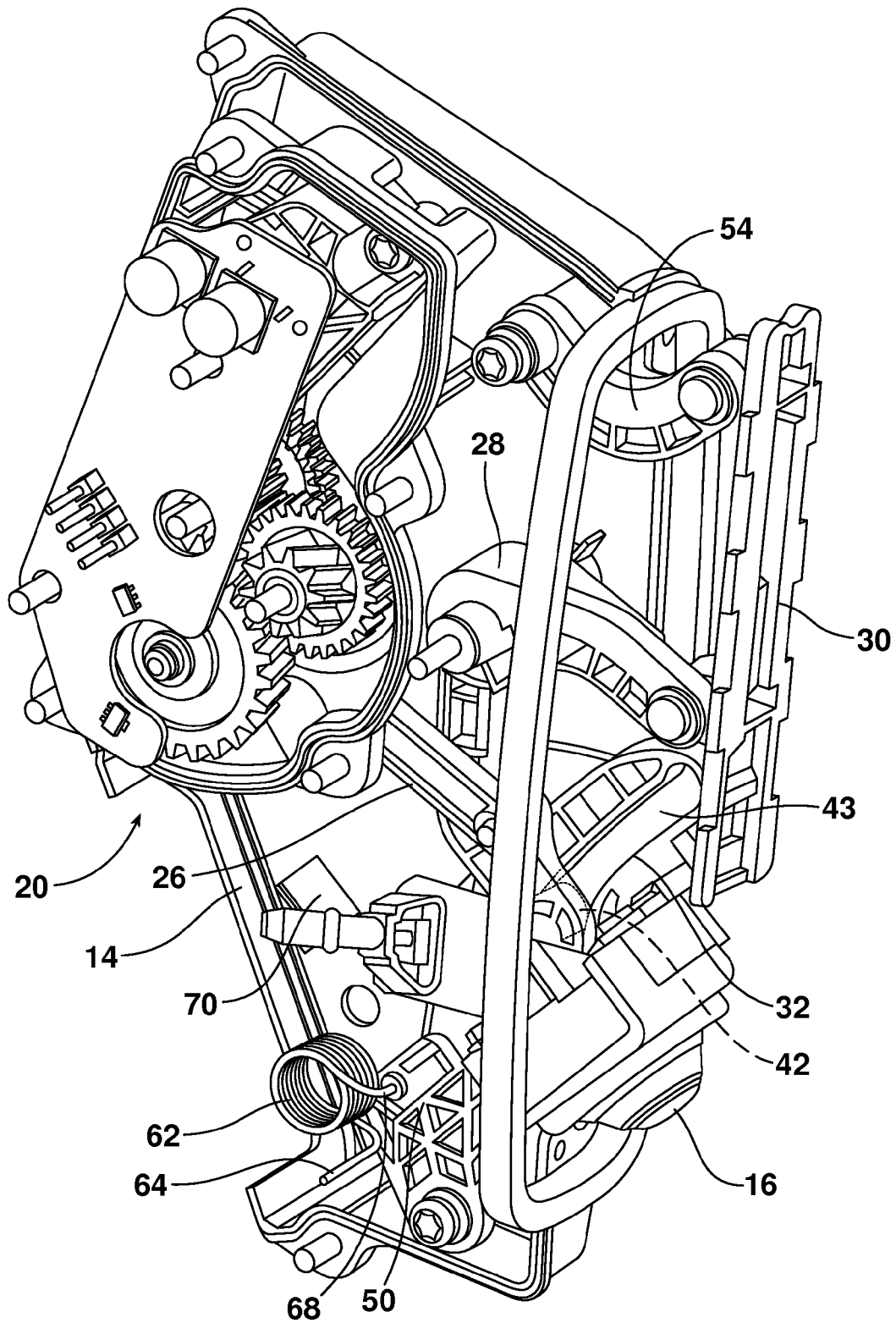
FIG. 5 is a second detailed, right side fragmentary view of the camera system in the fully deployed position.
Figure 6:
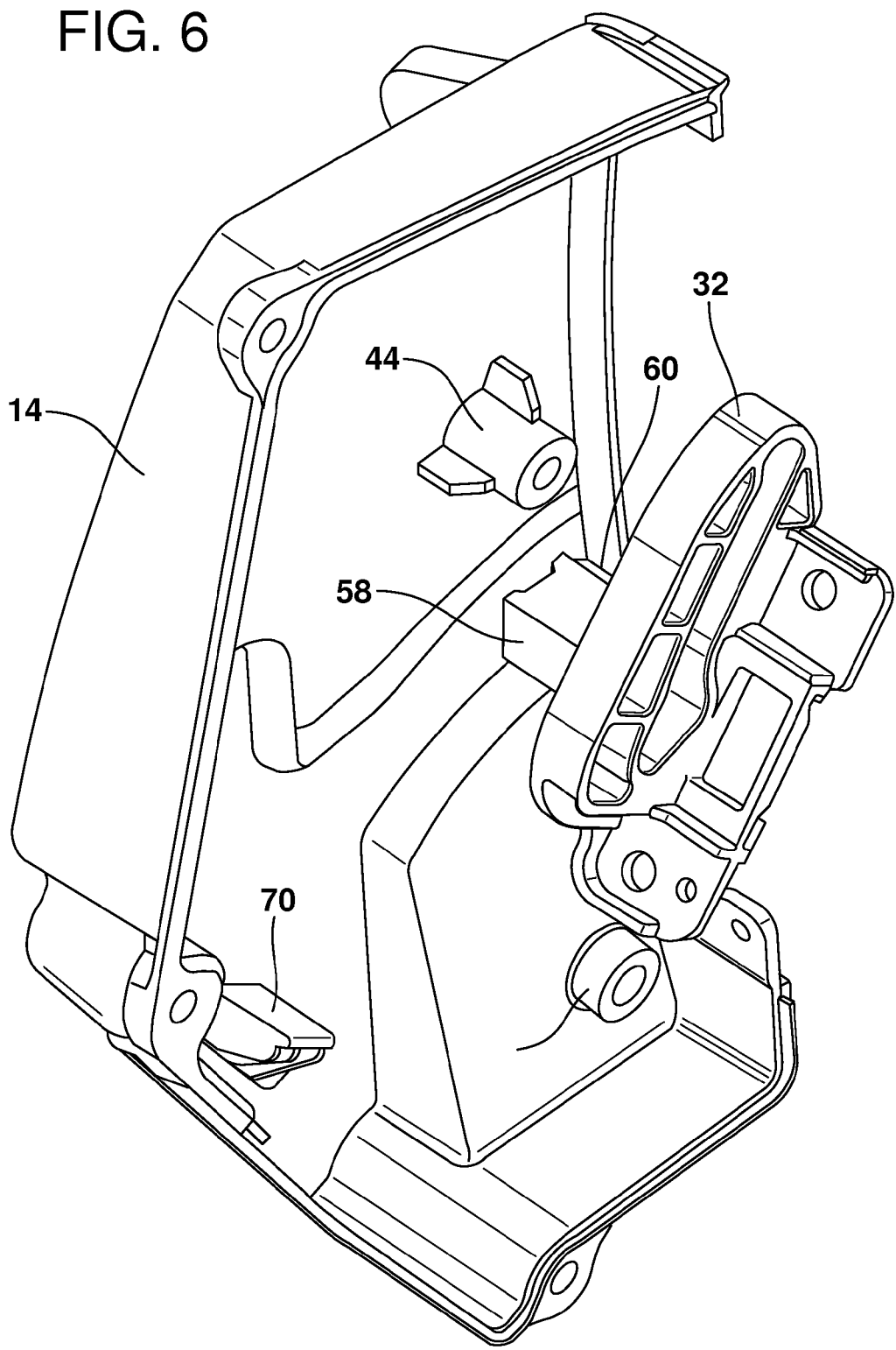
FIG. 6 is a detailed perspective view of the camera link with the abutment provided on the camera link engaging a first stop when the camera is in the fully deployed position.
Figure 8:
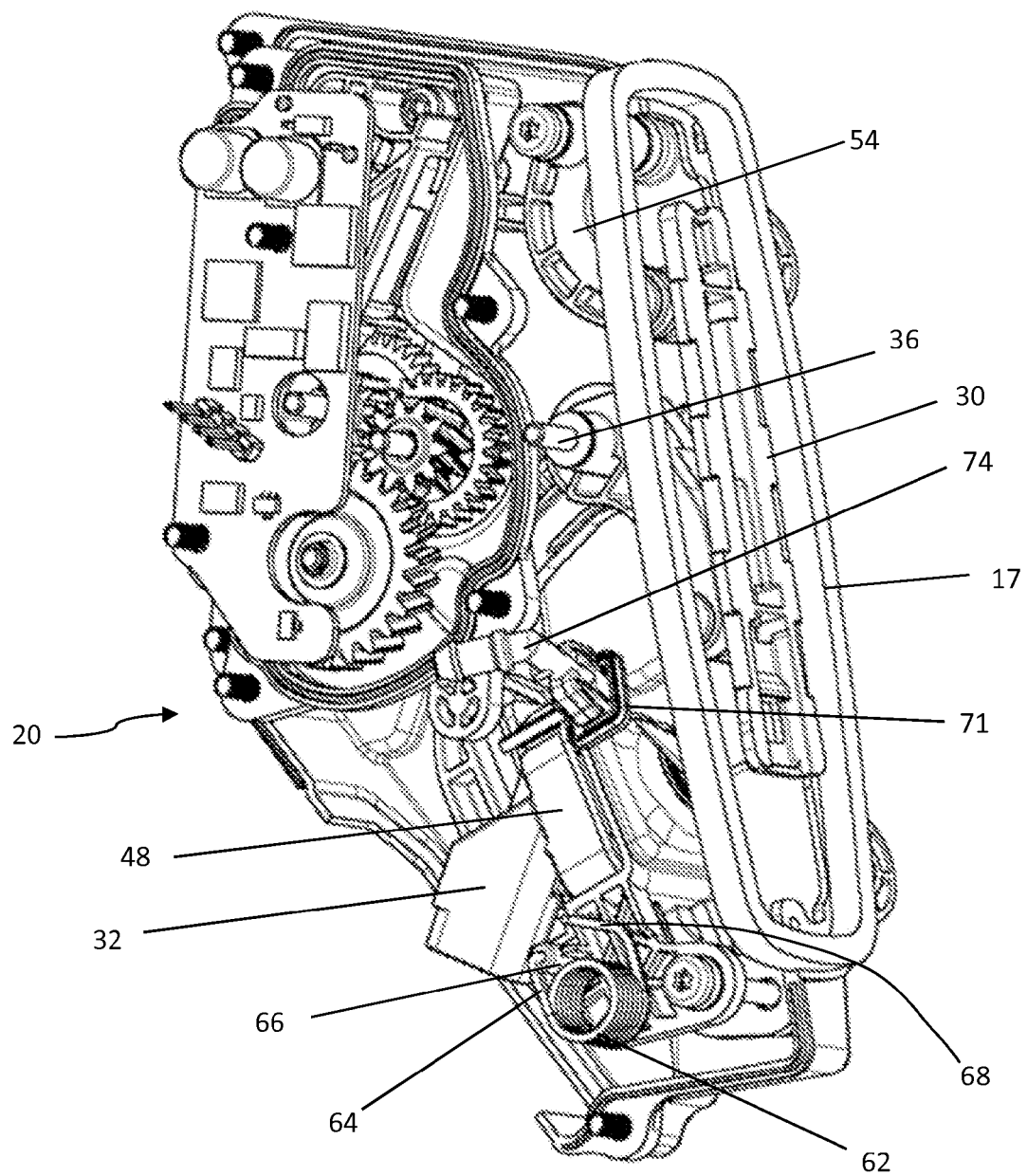
FIG. 8 is a cross-sectional view illustrating the biasing element or torsion spring that is connected to the support arm for the camera.

FIGS. 2 and 3 illustrate the hidden camera system 10 with the camera 16 in the fully retracted position and the camera hidden from view by the cover (deleted from figure for clarity). When activated, the camera 16 is displaced to a fully deployed position illustrated in FIGS. 4 and 5. More specifically, the drive motor 18 operates through the gear transmission 20 and the driveshaft 34 to turn the crank arm 24 in the direction of action arrow A. This causes the first link 26 to translate in the direction of action arrow B so as to pivot the second link 28 about the boss 44 in the direction of action arrow C. This simultaneously causes the cover 12 to pivot open about the boss 56 and the camera 16 to pivotally deploy about the boss 52. An abutment 58, projecting from the side of the camera mounting bracket 32 engages a stop 60 on the housing 14 when the camera 16 and cover 12 are both in the fully deployed position. Here it should be appreciated that a biasing element, in the form of a torsion spring 62 received around the boss 52, biases the camera 16 toward the fully deployed position. See FIG. 8. This ensures that the camera 16 is repeatedly fully deployed into the same position during each deployment. More specifically, the torsion spring 62 has a first end 64 secured in a socket 66 to the housing 14 and a second end 68 engaging the camera mounting bracket 32.

When it is desired to retract the camera 16, the drive motor 18 is driven in the opposite direction. This drives the crank arm 24 in the direction opposite to action arrow A which in turn causes the drive link 26 to translate in a direction opposite to action arrow B. As a result, the second link 28 pivots in a direction opposite to action arrow C causing the camera 16 to be retracted while the cover 12 is closed. When the camera 16 is fully retracted and the cover 12 is fully closed, the abutment 58 engages a second stop 70 formed on the housing 14. See FIG. 7.

Figure 9:
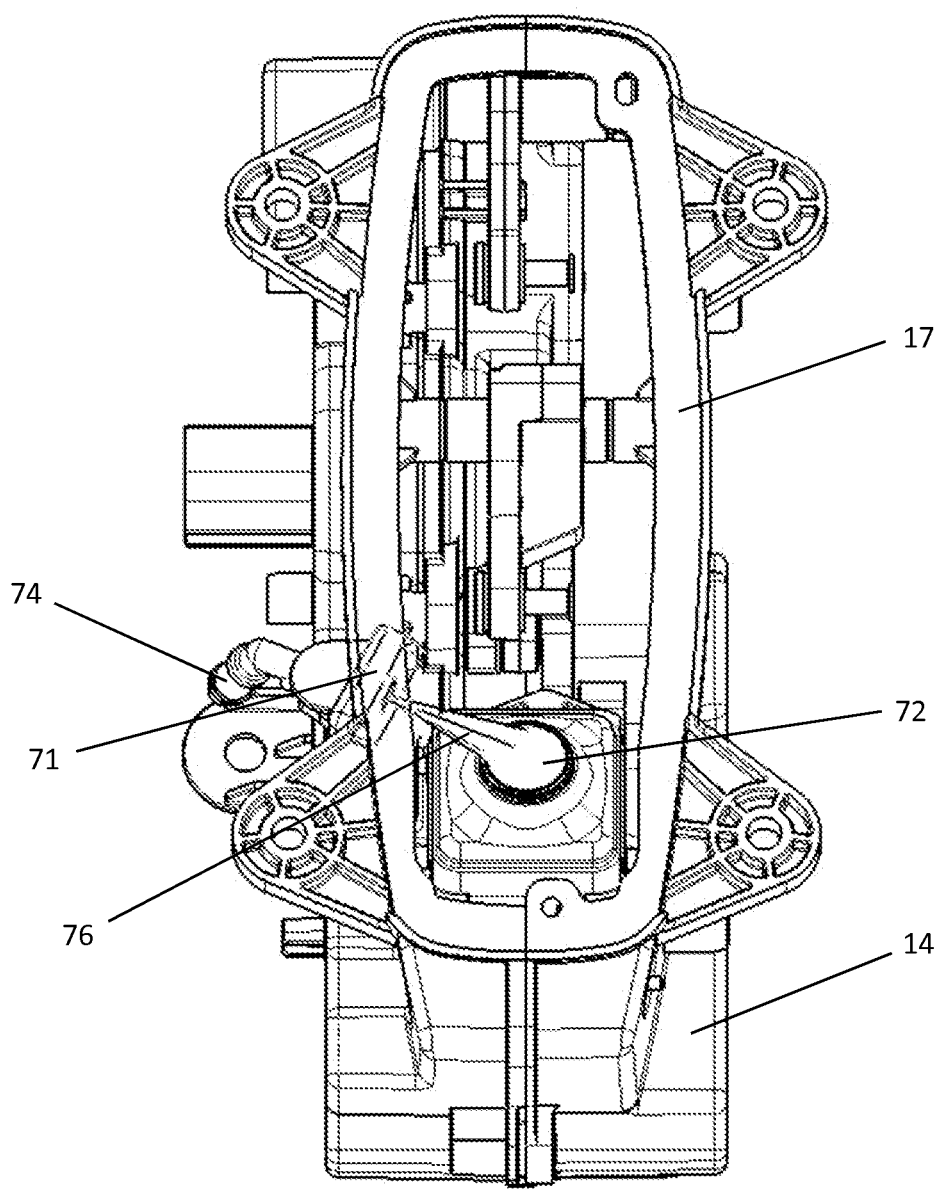
FIG. 9 is a detailed front elevational view illustrating the camera washing system.

As illustrated in FIG. 9, the hidden camera system 10 may also include a nozzle jet 71 for cleaning the lens or cover window 72 of the camera 16. More specifically, during each cleaning cycle cleaning fluid is fed by a pump (not shown) to the nozzle jet 71 through the delivery line 74 and is expelled in a washing stream 76 across the lens or cover window 72. Such a cleaning cycle may be initiated from inside the vehicle each time the vehicle operator engages the wiper washer to clean the windshield.

Figure 10:
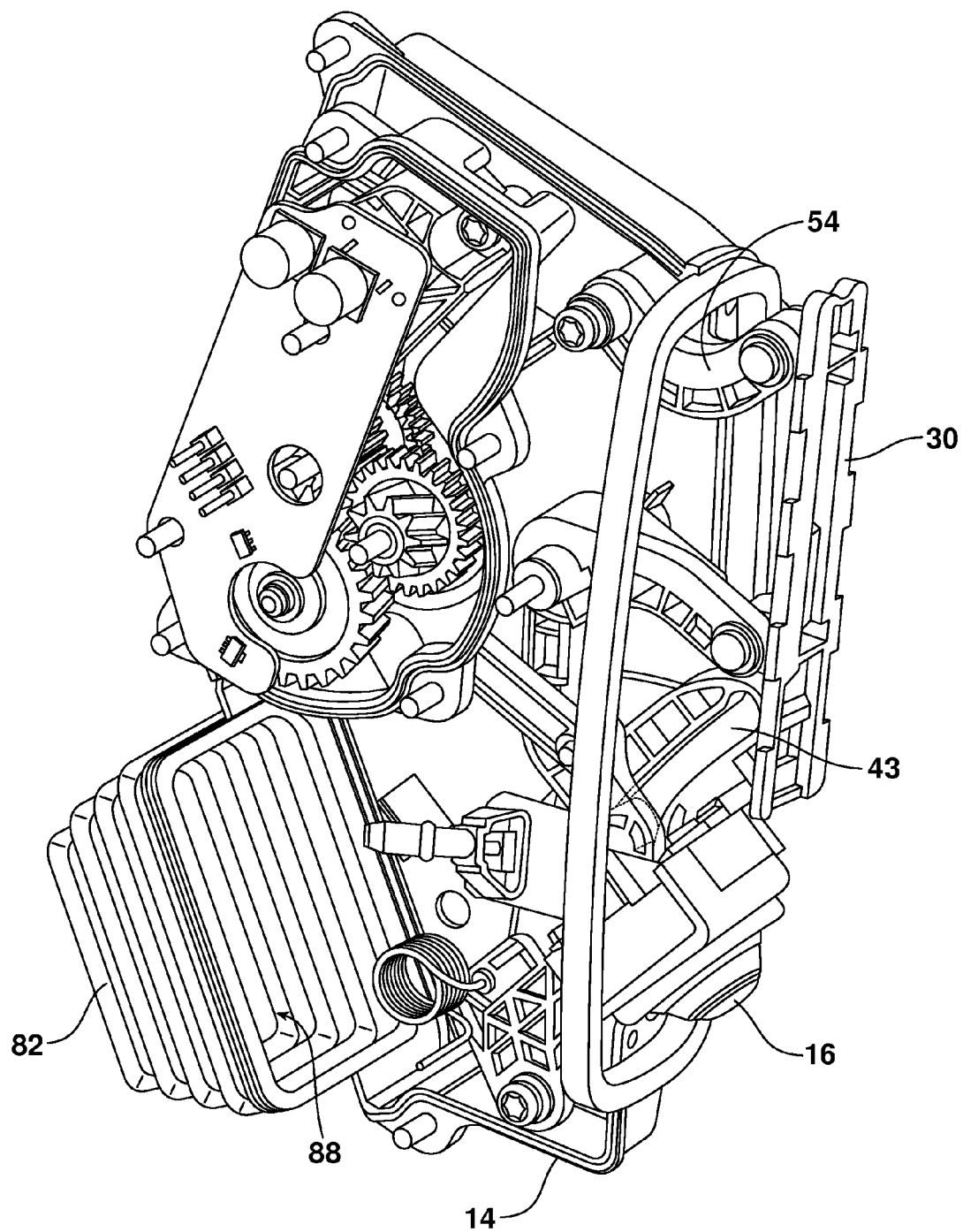
FIG. 10 is a perspective view of a first embodiment of flexible seal closing the second opening in the rear of the housing/enclosure.
Figure 11:
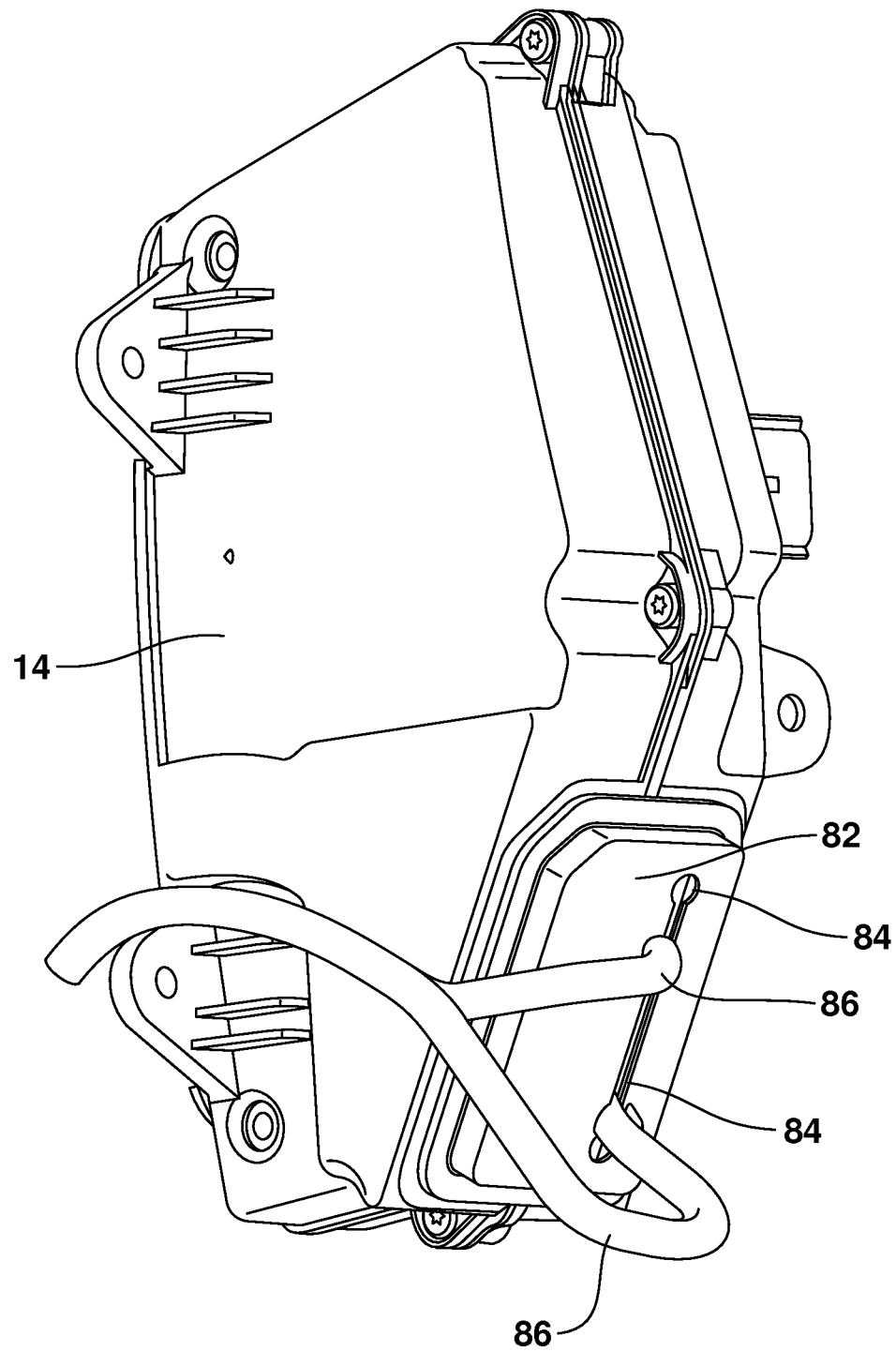
FIG. 11 is a perspective view of another embodiment of flexible seal closing the second opening in the rear of the housing/enclosure.

As illustrated in FIGS. 2-5 and 7, the housing or enclosure 14 includes a second or rear opening 80 opposite the first or front opening 19. As illustrated in FIGS. 10 and 11, a flexible seal 82 closes and seals the opening 80 to prevent dirt, debris and contaminants from entering the housing 14 from the rear side. This helps to maintain the drive motor 18, transmission 20, linkage 22 and camera 16 in peak operating condition.

In addition, it should be appreciated that the flexible seal 82 provides additional pedestrian protection when compared to a hard or rigid structural element. More specifically, the flexible nature of the seal 82 will not convey load from the forward portion of the housing 14 in the event of an impact event should the seal contact fixed members to the rear of the housing. As such, an enclosure or housing 14 with a flexible rear wall or seal 82 provides a distinct safety benefit.

Figure 10A:
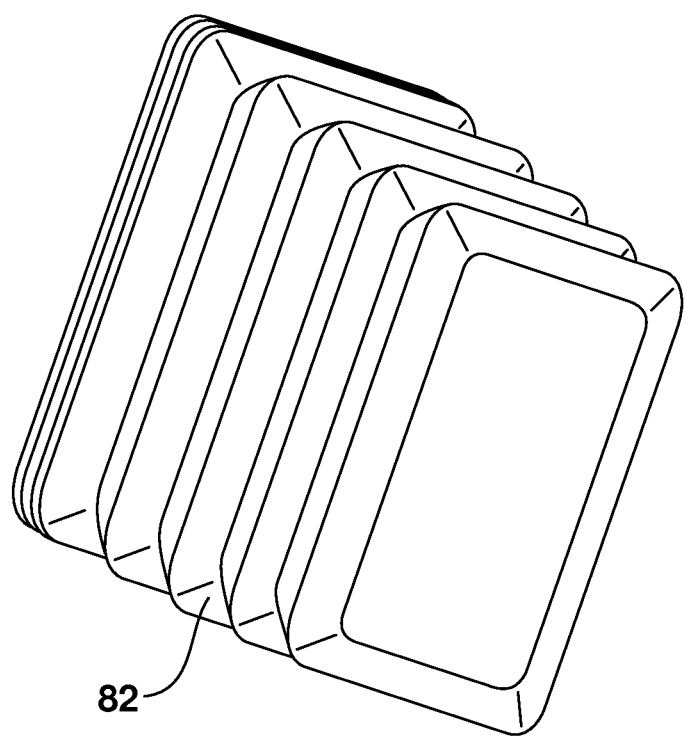
FIG. 10*a* is a detailed perspective view of the flexible seal illustrated in FIG. 10.

It should be appreciated that the flexible wall or seal 82 may take a number of different forms. In the embodiment illustrated in FIGS. 10 and 10a, the seal 82 comprises a pleated diaphragm of elastomeric or resilient material. In the FIG. 11 embodiment, the flexible wall or seal 82 includes one or more openings 84 to route control and/or power lines 86. In any embodiment, the seal 82 may include a cavity 88 open toward the interior of the housing 14.

The foregoing has been presented for purposes of illustration and description. It is not intended to be exhaustive or to limit the camera system 10 to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A hidden camera system for a motor vehicle, comprising:
    a housing including a first opening and a second opening;
    a displaceable cover for opening and closing said first opening;
    a camera received in said housing and deployable with respect to said first opening; and
    a flexible seal closing said second opening.

2. The system of claim 1, wherein said second opening is opposite said first opening.

3. The system of claim 1, wherein said first opening is provided at a front side of said housing and said second opening is provided at a rear side of said housing.

4. The system of claim 1, wherein said flexible seal includes a cavity facing toward said housing.

5. The system of claim 1, further including a drive motor and associated transmission received in said housing.

6. The system of claim 5, further including a linkage connecting said drive motor and transmission to said camera and said cover.

7. The system of claim 6, wherein said linkage includes a crank arm, a first link, a second link, a cover support bracket and a camera mounting bracket.

8. The system of claim 7, wherein said drive motor is connected to said crank arm through said transmission.

9. The system of claim 8, further including a biasing element to bias said camera into a fully deployed position.

10. The system of claim 9, wherein said camera projects at least partially through said first opening when in said fully deployed position.

11. A hidden camera system for a motor vehicle, comprising:
    a housing including a first opening and a second opening;
    a displaceable cover for opening and closing said first opening;
    a camera received in said housing and deployable with respect to said first opening; and a flexible seal closing said second opening, wherein the flexible seal is a pleated diaphragm.

\* \* \* \* \*